United States Patent
Kim et al.

(10) Patent No.: US 10,386,961 B2
(45) Date of Patent: *Aug. 20, 2019

(54) TOUCH WINDOW

(71) Applicant: LG INNOTEK CO., LTD., Seoul (KR)

(72) Inventors: Hyun Soo Kim, Seoul (KR); Chan Kyu Koo, Seoul (KR); Jun Sik Shin, Seoul (KR); Joon Hyuk Yang, Seoul (KR); In Seok Kang, Seoul (KR); Byung Youl Moon, Seoul (KR); Jun Phill Eom, Seoul (KR); June Roh, Seoul (KR); Dong Mug Seong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,007

(22) Filed: Nov. 23, 2018

(65) Prior Publication Data

US 2019/0095037 A1  Mar. 28, 2019

Related U.S. Application Data

(63) Continuation of application No. 15/119,551, filed as application No. PCT/KR2015/001353 on Feb. 10, 2015.

(30) Foreign Application Priority Data

Feb. 17, 2014 (KR) .......... 10-2014-0018130
Mar. 25, 2014 (KR) .......... 10-2014-0034928

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC . G06F 2203/04112; G06F 2203/04103; G06F 3/041; G02F 1/13338
See application file for complete search history.

(56) References Cited

U.S. PATENT DOCUMENTS

2009/0219258 A1  9/2009  Geaghan et al.
2010/0123670 A1  5/2010  Philipp
(Continued)

FOREIGN PATENT DOCUMENTS

JP  2012-094115  5/2012
JP  2014-016944  1/2014
(Continued)

OTHER PUBLICATIONS

International Search Report and Written Opinion dated May 19, 2015 issued in Application No. PCT/KR2015/001353 (Full English Text).

(Continued)

*Primary Examiner* — Gerald Johnson
(74) *Attorney, Agent, or Firm* — KED & Associates, LLP

(57) ABSTRACT

Disclosed is a touch window which includes a substrate; a plurality of sensing electrodes on the substrate; and an opening part between the sensing electrodes.

28 Claims, 14 Drawing Sheets

(52) U.S. Cl.
CPC .............. *G06F 2203/04102* (2013.01); *G06F 2203/04103* (2013.01); *G06F 2203/04112* (2013.01)

(56) References Cited

U.S. PATENT DOCUMENTS

| | | |
|---|---|---|
| 2013/0100054 A1 | 4/2013 | Philipp |
| 2013/0278513 A1 | 10/2013 | Jang |
| 2013/0299222 A1* | 11/2013 | Lee .................. G06F 3/044 174/258 |
| 2013/0341079 A1 | 12/2013 | Hwang et al. |
| 2014/0118635 A1 | 5/2014 | Yang |
| 2014/0293162 A1* | 10/2014 | Park .................. G02F 1/133502 349/12 |
| 2015/0177876 A1 | 6/2015 | Ishii et al. |

FOREIGN PATENT DOCUMENTS

| | | |
|---|---|---|
| KR | 10-2011-0089423 | 8/2011 |
| KR | 10-2013-0103193 | 9/2013 |
| KR | 10-2013-0118072 | 10/2013 |
| KR | 10-2013-0138487 | 12/2013 |

OTHER PUBLICATIONS

U.S. Office Action issued in parent U.S. Appl. No. 15/119,551 dated May 3, 2018.

\* cited by examiner

[Fig. 1]
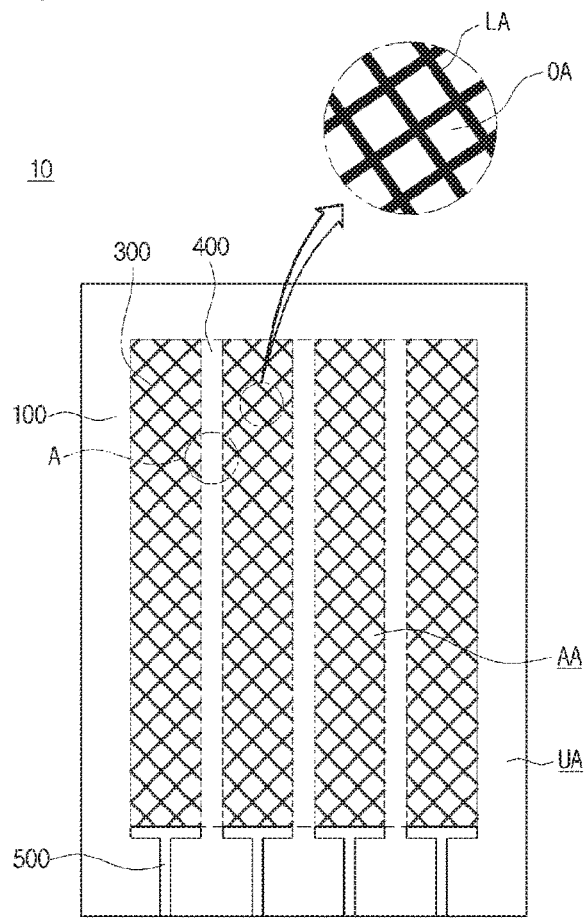
[Fig. 2]
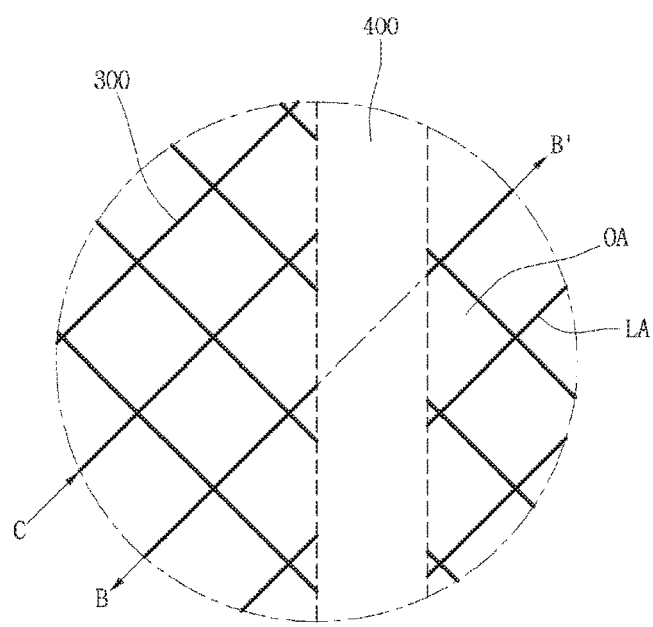

[Fig. 3]
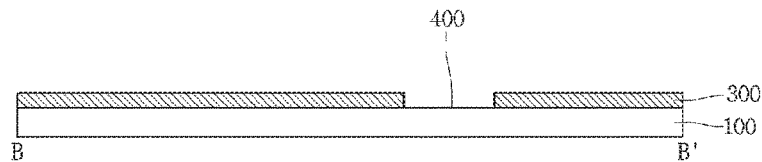
[Fig. 4]
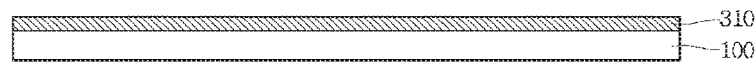
[Fig. 5]
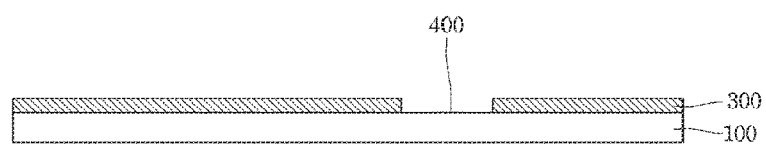
[Fig. 6]
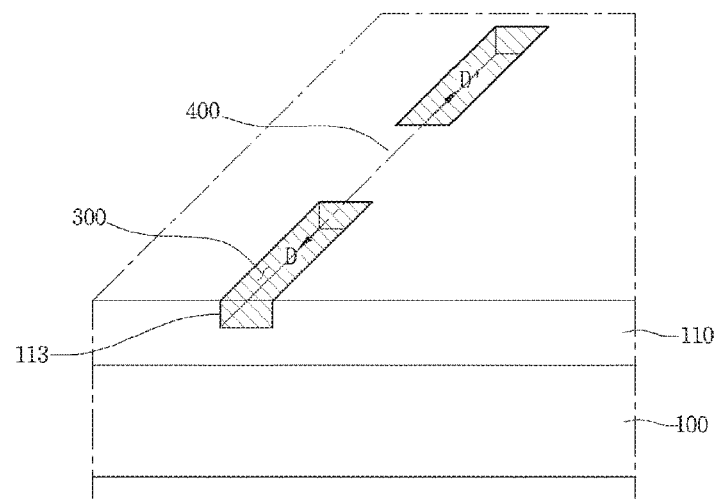
[Fig. 7]
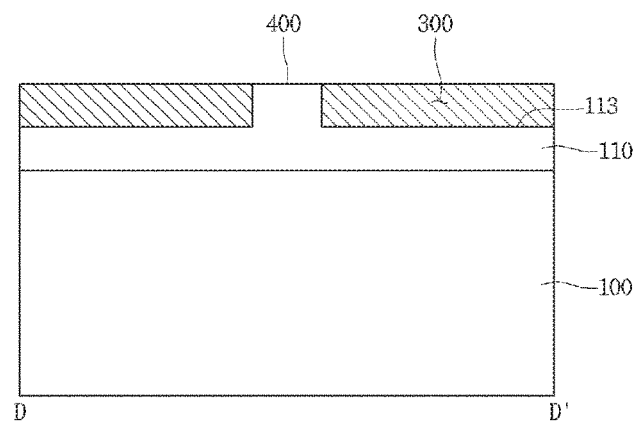

[Fig. 8]
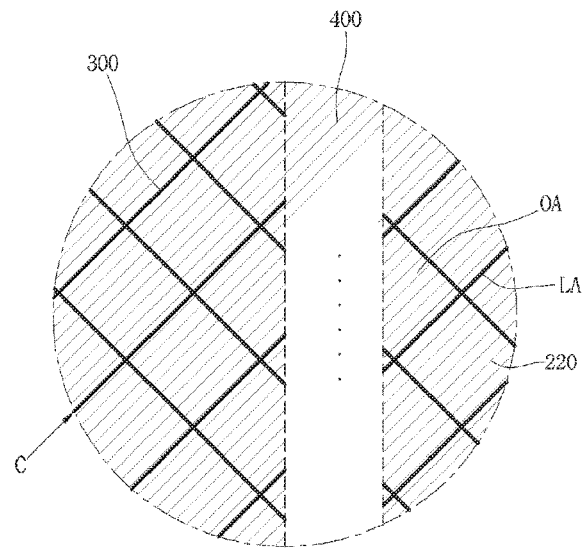
[Fig. 9]
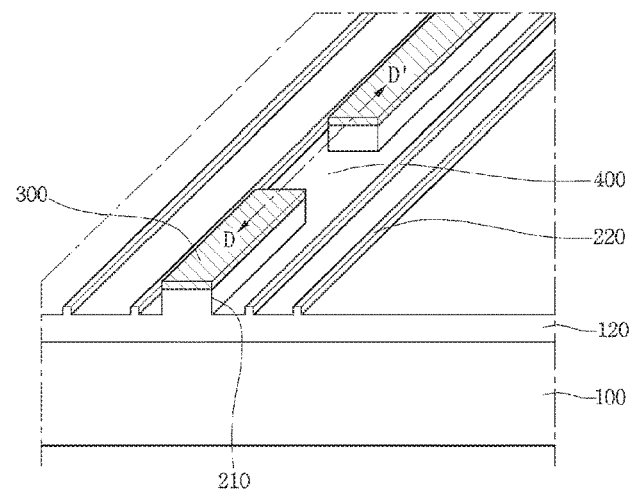
[Fig. 10]
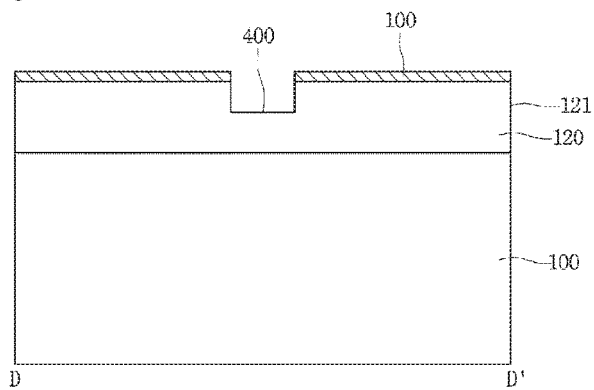

[Fig. 11]
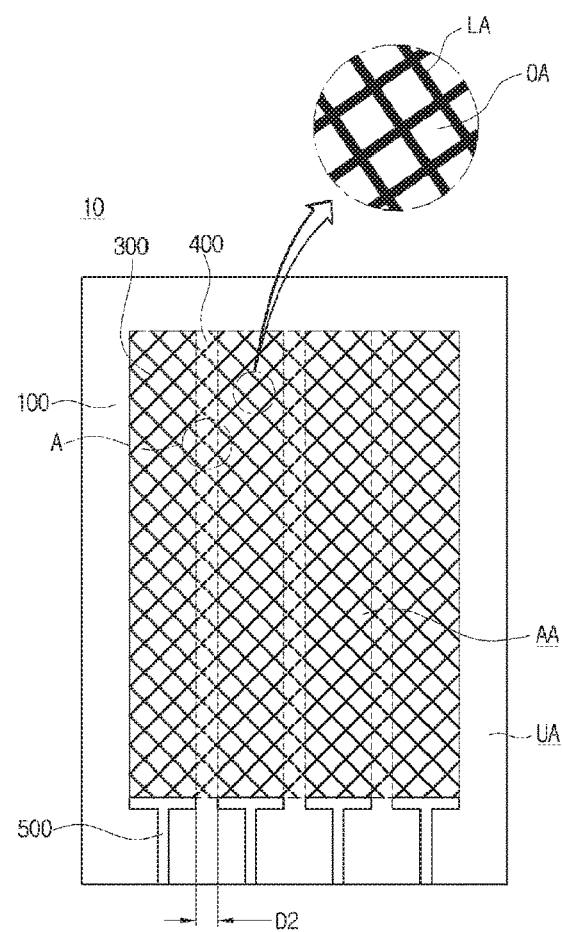
[Fig. 12]
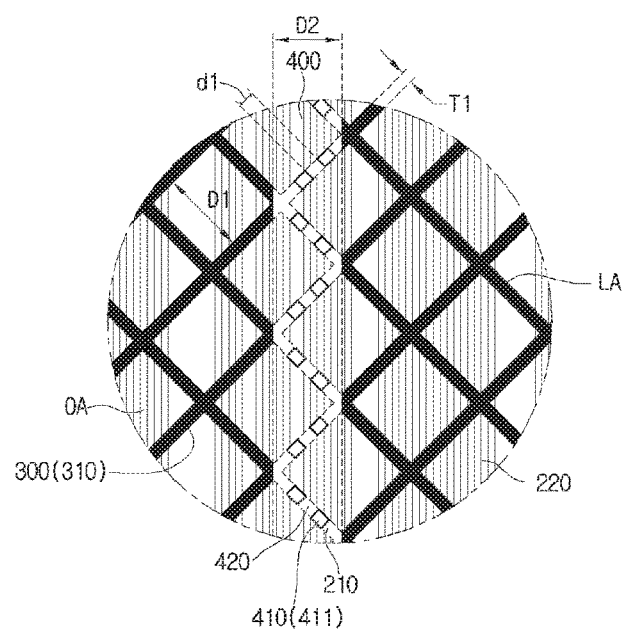

[Fig. 13]
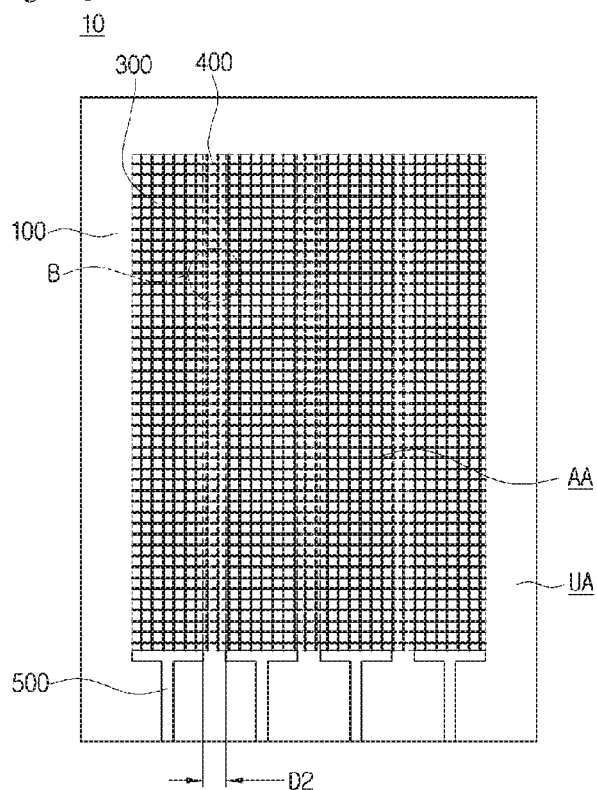
[Fig. 14]
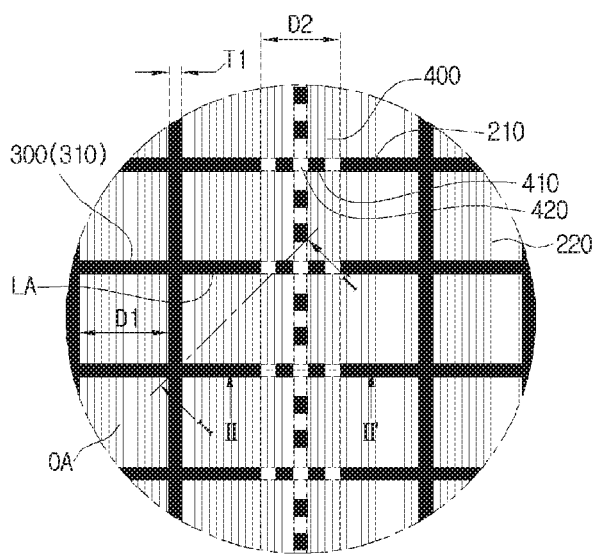

[Fig. 15]
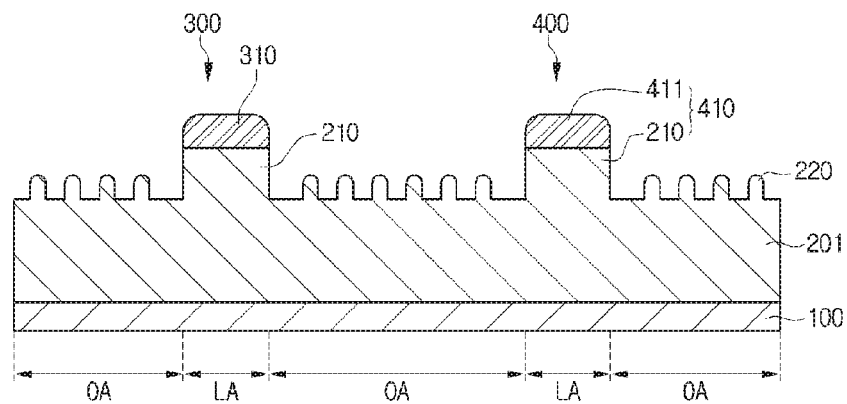
[Fig. 16]
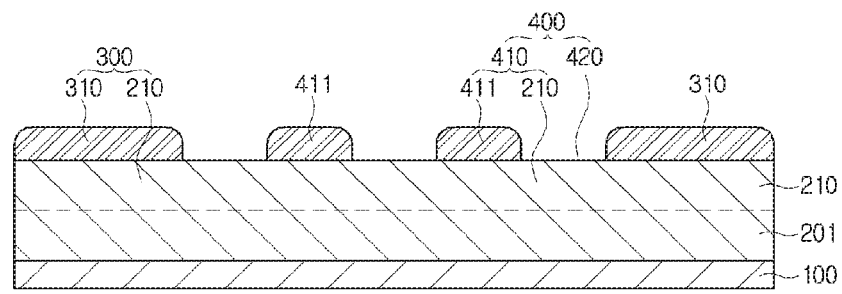
[Fig. 17]
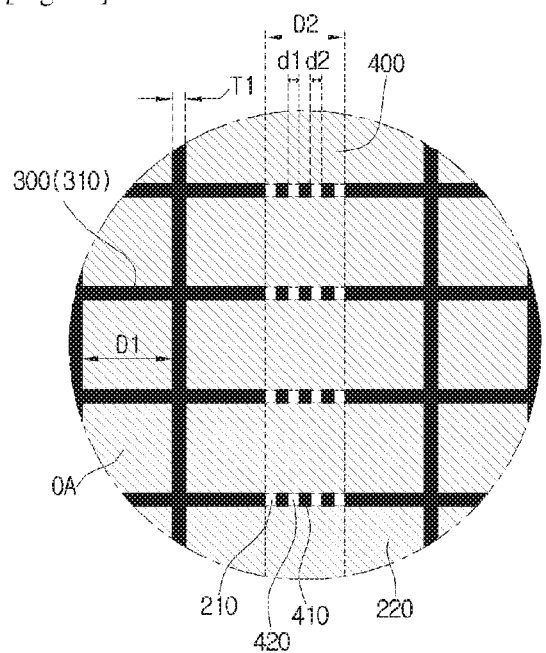

[Fig. 18]
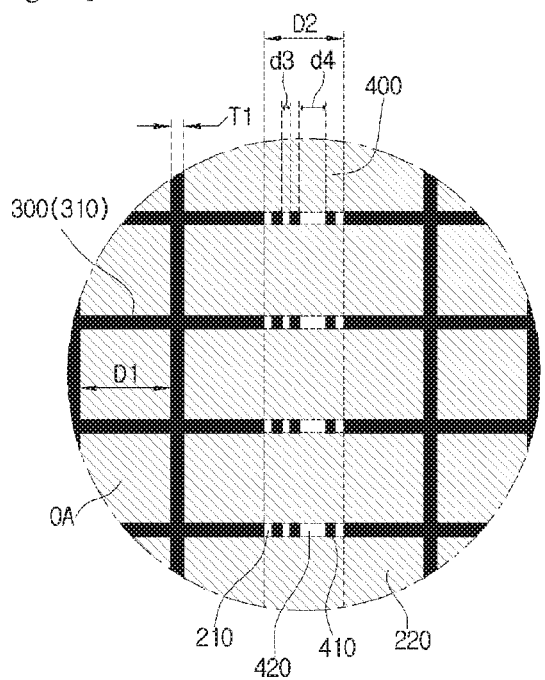
[Fig. 19]
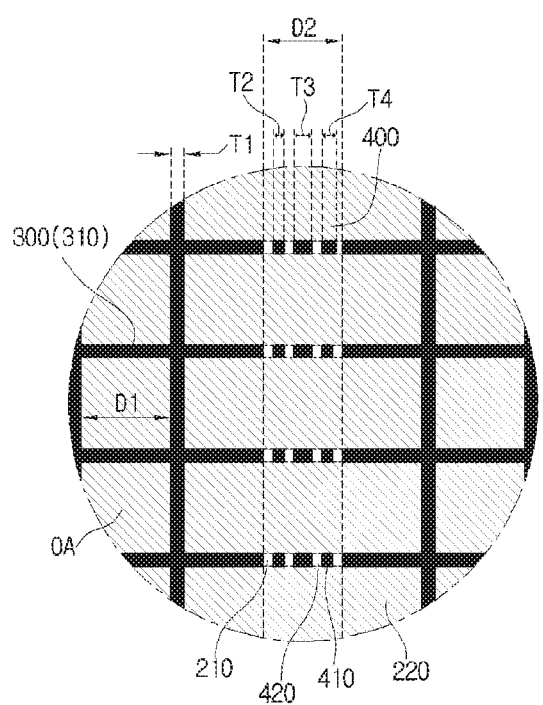

[Fig. 20]
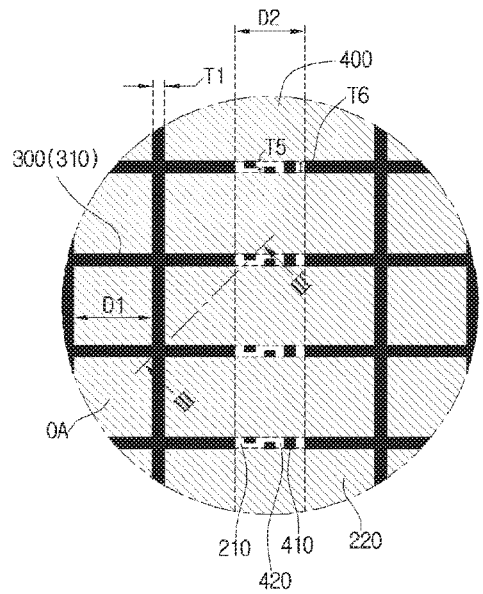
[Fig. 21]
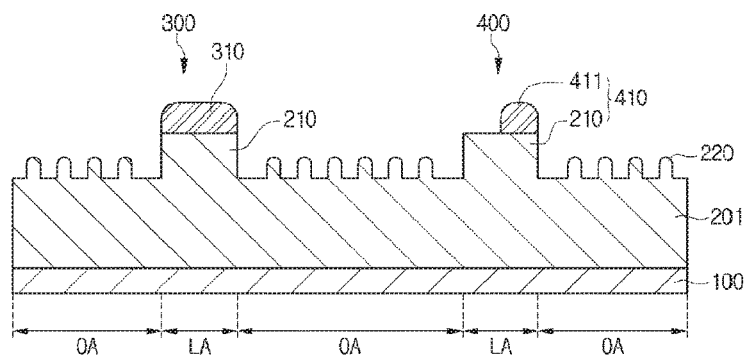
[Fig. 22]
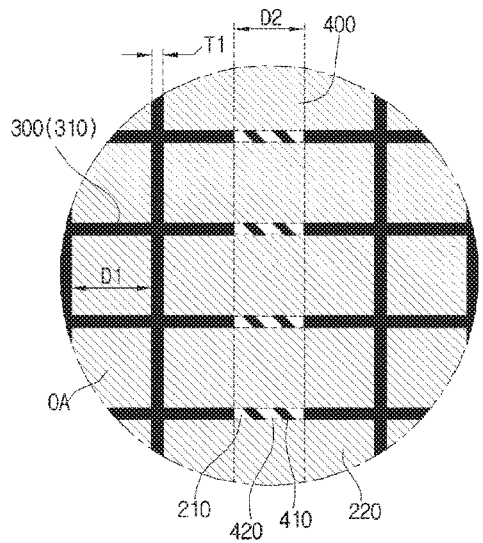

[Fig. 23]
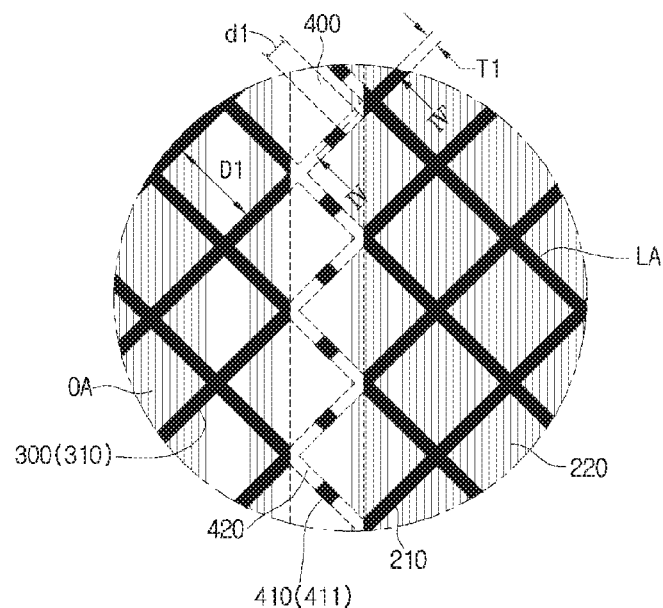
[Fig. 24]
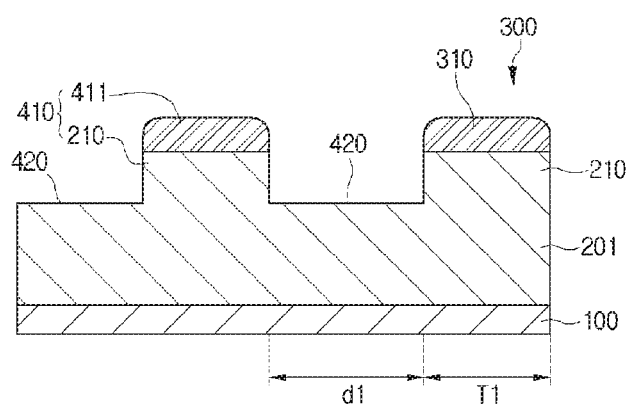

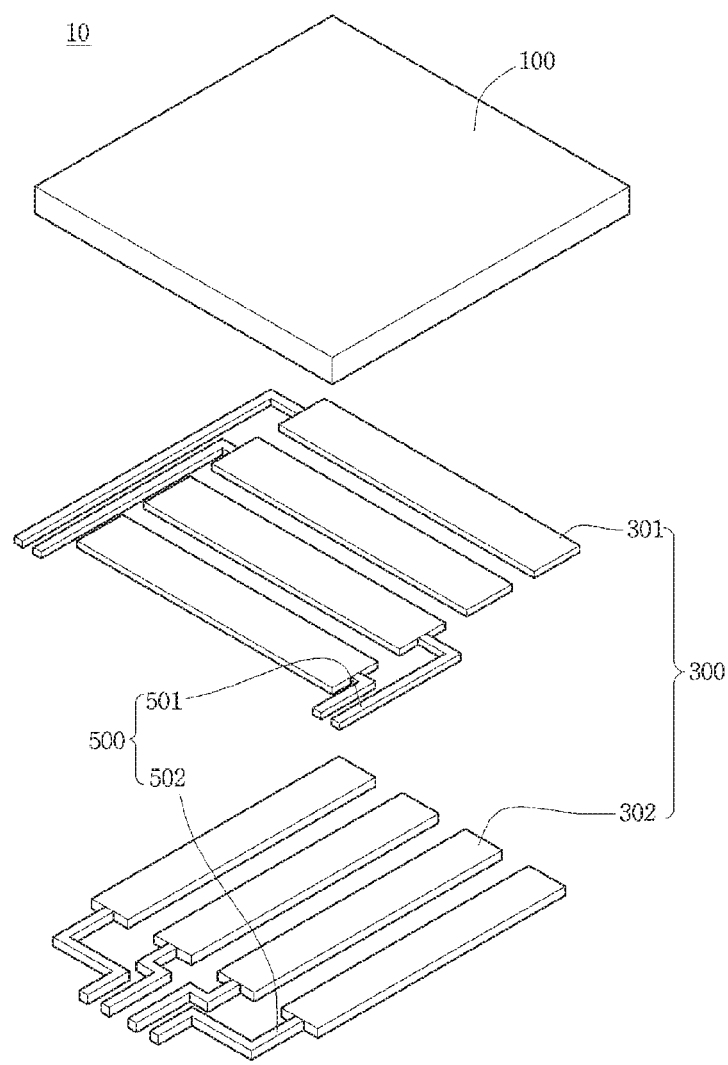
[Fig. 25]

[Fig. 26]
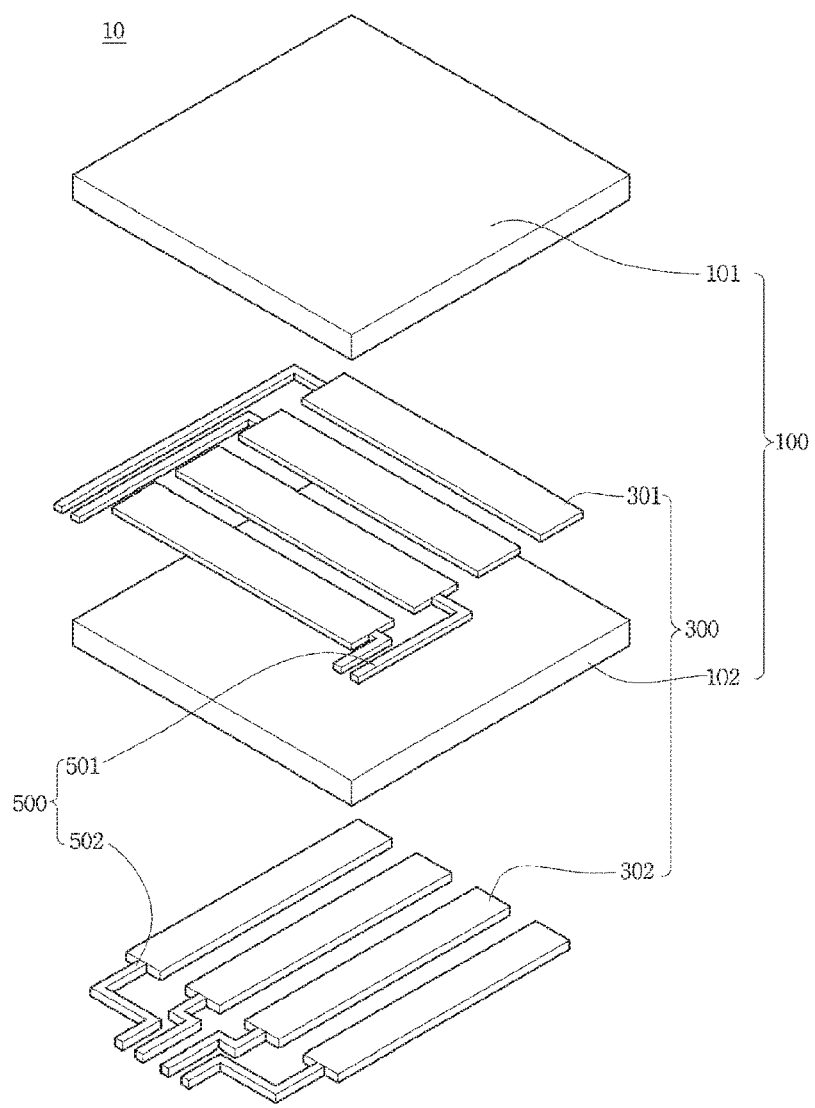
[Fig. 27]
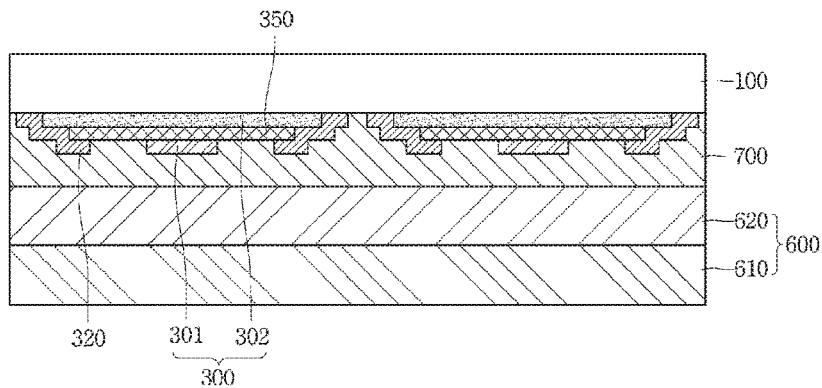

[Fig. 28]
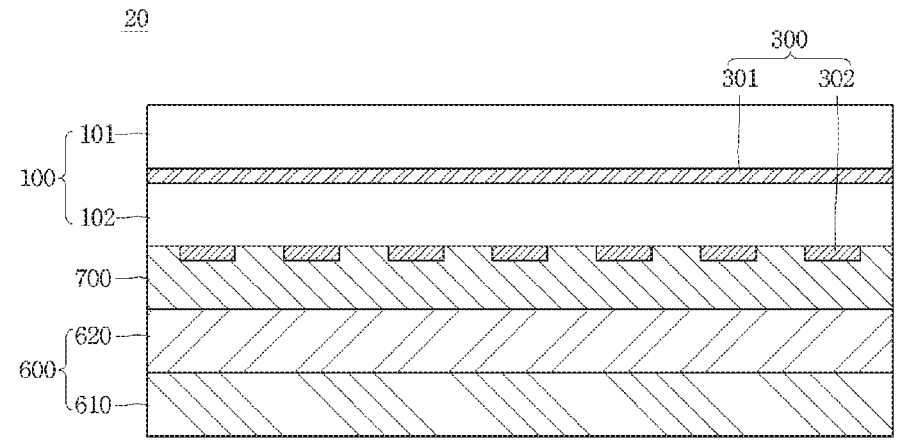
[Fig. 29]
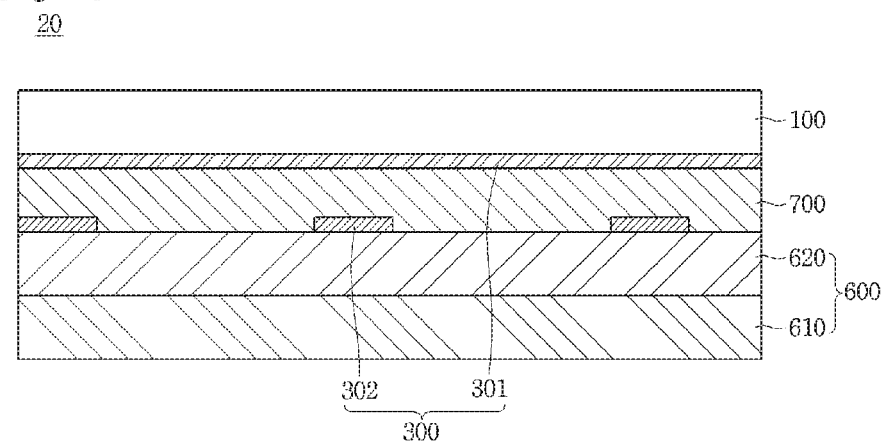
[Fig. 30]
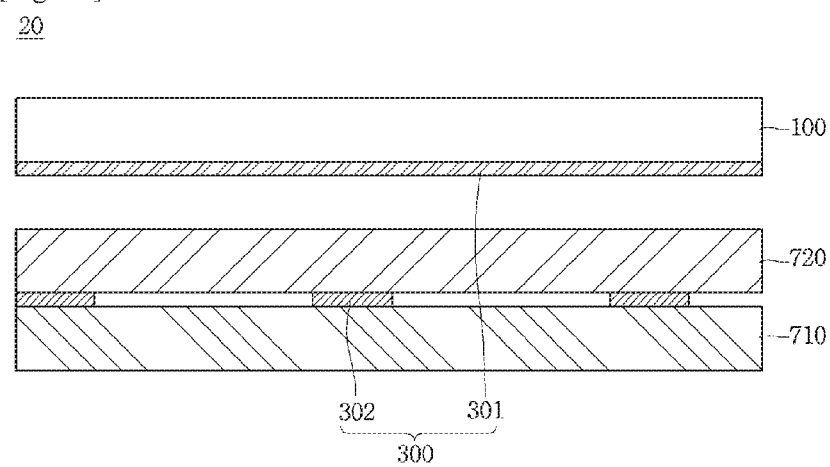

[Fig. 31]
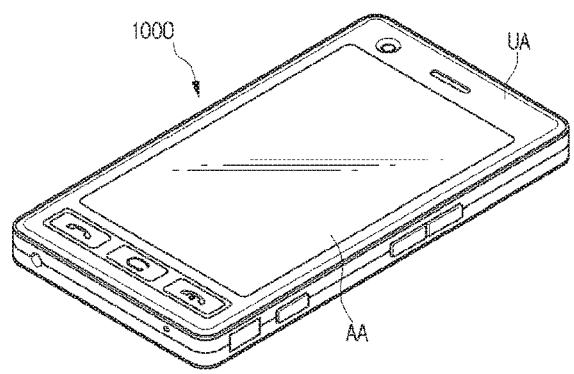
[Fig. 32]
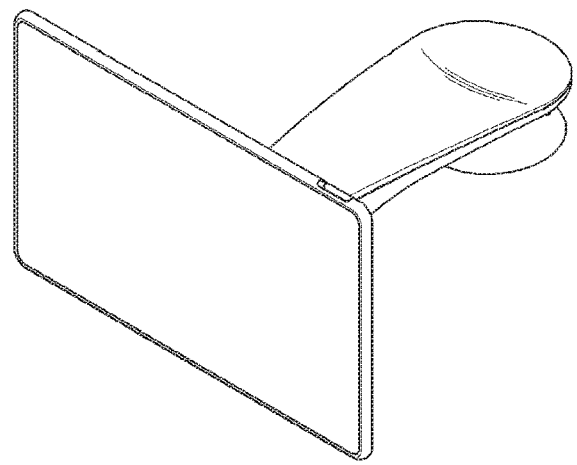
[Fig. 33]
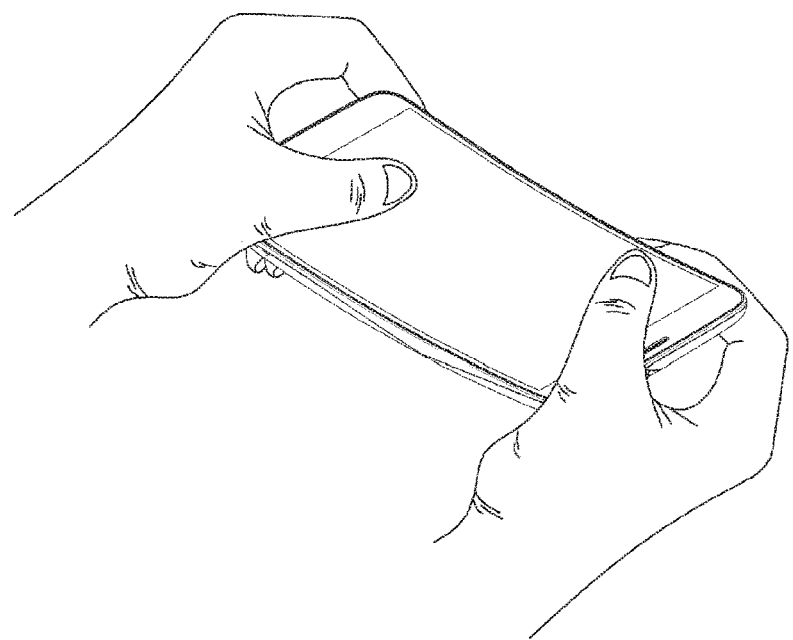

[Fig. 34]
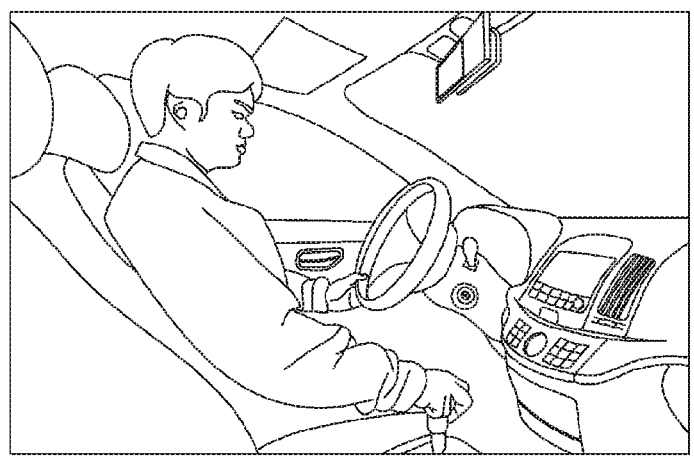

TOUCH WINDOW

CROSS-REFERENCE TO RELATED APPLICATIONS

This application is a Continuation Application of U.S. patent application Ser. No. 15/119,551 filed Aug. 17, 2016, which is a U.S. National Stage Application under 35 U.S.C. § 371 of PCT Application No. PCT/KR2015/001353, filed Feb. 10, 2015, which claims priority to Korean Patent Application No. 10-2014-0018130, filed Feb. 17, 2014 and Korean Patent Application No. 10-2014-0034928, filed Mar. 25, 2014, whose entire disclosures are hereby incorporated by reference.

BACKGROUND

1. Field

The disclosure relates to a touch window.

2. Background

Recently, a touch panel, which performs an input function through the touch of an image displayed on a display device by an input device, such as a stylus pen or a finger, has been applied to various electronic appliances.

The touch window may be representatively classified into a resistive touch window and a capacitive touch window. In the resistive touch panel, the position of the touch point is detected by detecting the variation of resistance according to the connection between electrode parts when pressure is applied to an input device. In the capacitive touch window, the position of the touch point is detected by detecting the variation in capacitance when a finger of the user is touched on the capacitive touch window between electrode parts. When taking of the convenience of a fabrication scheme and a sensing power, recently, the capacitive touch window has been spotlighted in a smaller model.

Indium tin oxide (ITO), which has been most extensively used as a transparent electrode of the touch window, is expensive and is easily subject to physical damage due to the bending or the flection of a substrate, so that the characteristic of the ITO for the electrode is deteriorated. Accordingly, the ITO is not suitable for a flexible device. Further, when the ITO is applied to a touch window having a large size, a problem occurs due to high resistance.

In order to solve the problem, researches and studies on an alternative electrode have been actively performed. Specifically, although the substitute for ITO is formed by making the shape of a mesh using a metallic material, a problem occurs in visibility or conductivity due to a short circuit existing between channels in such a mesh pattern.

DISCLOSURE

Technical Problem

The embodiment provides a touch window which is improved in reliability and visibility, and a display including the same.

Technical Solution

According to one embodiment, there is provided a touch window which includes a substrate; a plurality of sensing electrodes on the substrate; and an opening part between the sensing electrodes.

According to another embodiment, there is provided a touch window which includes a substrate; a sensing electrode disposed on the substrate and including a first conductive pattern; and an opening part disposed between the sensing electrodes.

Advantageous Effects

According to the embodiment, the touch window includes the opening part formed between the electrode parts, so that the electrode parts may be prevented from being short-circuited with each other

DESCRIPTION OF DRAWINGS

FIG. 1 is a plan view showing a touch window according to an embodiment.

FIG. 2 is an enlarged view showing a touch window according to an embodiment.

FIG. 3 is a sectional view showing a touch window according to an embodiment.

FIGS. 4 and 5 are views illustrating a method of manufacturing a touch window according to an embodiment.

FIGS. 6 and 7 are views showing the touch window according to another embodiment, where FIG. 6 is a perspective view of the touch window when viewed in the direction of C and FIG. 7 is a sectional view taken along line D-D' of FIG. 6.

FIG. 8 is an enlarged view showing a touch window according to an embodiment.

FIG. 9 is a perspective view of the touch window of FIG. 8 when viewed in the direction of C, and FIG. 10 is a sectional view taken along line D-D' of FIG. 9.

FIG. 11 is a plan view showing a touch window according to another embodiment.

FIG. 12 is an enlarged view of portion A of FIG. 1.

FIG. 13 is a plan view showing a touch window according to another embodiment.

FIG. 14 is an enlarged view of portion A of FIG. 3.

FIG. 15 is a sectional view taken along line I-I' of FIG. 14.

FIG. 16 is a sectional view taken along line II-II' of FIG. 14.

FIGS. 17 to 20 are enlarged views of touch windows according to various embodiments.

FIG. 21 is a sectional view taken along line III-III' of FIG. 10.

FIG. 22 is an enlarged view of a touch window according to another embodiment.

FIG. 23 is an enlarged view of a touch window according to another embodiment.

FIG. 24 is a sectional view taken along line VI-VI' of FIG. 23.

FIGS. 25 and 26 are exploded perspective views of touch windows according to another embodiments FIGS. 27 to 30 are views showing a touch device in which a touch widow and a display panel are coupled to each other according to an embodiment.

FIGS. 31 to 34 are views showing one example of a touch device to which a touch window is applied according to an embodiment.

BEST MODE

Mode for Invention

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is referred as to be connected to the other part, the parts are not only directly connected to each other, but also indirectly connected to each other while interposing another part therebetween. In the following description, when a predetermined part is referred as to "include" a predetermined component, the predetermined part does not exclude other components, but may further include other components unless indicated otherwise.

The thickness and size of each layer (film), region, pattern, or structure shown in the drawings may be exaggerated, omitted or schematically drawn for the purpose of convenience or clarity. In addition, the size of each layer (film), region, pattern, or structure does not utterly reflect an actual size.

Hereinafter, embodiments will be described with reference to accompanying drawings.

Referring to FIGS. 1 to 3, a touch window 10 according to the embodiment may include a substrate 100, a sensing electrode 300, an opening part 400 and a wire electrode 500.

First, the substrate 100 may be flexible or rigid. For example, the substrate 100 may include glass or plastic. In detail, the substrate 100 may include chemically tempered/ half-tempered glass such as soda lime glass or aluminosilicate glass, reinforced or flexible plastic such as polyimide (PI), polyethylene terephthalate (PET), propylene glycol (PPG), or polycarbonate (PC), or sapphire.

In addition, the substrate 100 may include an optical isotropic film. For example, the substrate 100 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, the substrate 100 may be bent to have a partial curved surface. That is, the substrate 100 may be bent to have a partial flat surface and a partial curved surface. In detail, an end of the substrate 100 may be bent to have a curved surface or may be bent or flexed to have a surface including a random curvature.

Further, the substrate 100 may include a flexible substrate 100 having a flexible property.

In addition, the substrate 100 may include a curved or bended substrate 100. That is, a touch window including the substrate 100 may be formed to have a flexible, curved or bended property. For this reason, the touch window according to the embodiment may be easily portable and may be variously changed in design.

The sensing electrode 300, the wire electrode 500 and a printed circuit board may be disposed on the substrate 100. That is, the substrate 100 may be a support substrate 100.

The substrate 100 may include a cover substrate 100. That is, the sensing electrode 300, the wire electrode 500 and the printed circuit board 100 may be supported by a cover substrate. In addition, an additional cover substrate may be further disposed on the substrate 100. That is, the sensing electrode 300, the wire electrode 500 and the printed circuit board may be supported by the substrate 100, and the substrate 100 and the cover substrate may be combined (adhesive to) with each other through an adhesive layer.

The substrate 100 may have an active area AA and an unactive area UA defined therein.

An image may be displayed in the active area AA. The image is not displayed in the unactive area UA provided at a peripheral portion of the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

The active area AA signifies an area through which a touch instruction of a user may be input. In addition, the unactive area UA, which is provided at an outer portion of the active area AA, is not activated even if a user touches the unactive area UA, so the unactive area UA signifies an area through which any touch instructions cannot be input.

When the touch window 10 is attached to a display panel in use, the active area AA and the unactive area UA of the touch window 10 may correspond to a display area and a non-display area of the display device. The display area is an area to display an image and the non-display area is an area in which the image is not displayed. Thus, the active area AA of the touch window 10 may be configured to transmit light and the unactive area UA of the touch window 10 may be configured not to transmit light.

The sensing electrode 300 may be formed in the active area AA such that the input device may be sensed. The wire electrode 500 electrically connected to the sensing electrode 300 may be formed in the unactive area UA. In addition, an external circuit connected to the wire electrode 500 may be placed in the unactive area UA.

When an input device such as a finger is touched onto the touch window 10, the difference in capacitance is made on a touched portion by the input device, and the touched portion representing the difference in capacitance may be detected as a touch point.

An outer dummy layer may be formed in the unactive area UA of the substrate 100. The outer dummy layer may be coated with a material having a predetermined color so that the wires and the printed circuit board 100 connecting the wires to the external circuit cannot be viewed from the outside.

The outer dummy layer may have a color suitable for a desired outer appearance thereof. For example, the outer dummy layer includes black pigments to represent black or white pigments to represent white. In addition, various colors such as red or blue may be represented by using various color films.

In addition, a desired logo may be formed in the outer dummy layer through various schemes. The outer dummy layer may be formed through deposition, print, and wet coating schemes.

The outer dummy layer may be disposed in at least one layer. For example, the outer dummy layer may be disposed in one layer or in two layers having mutually different widths.

The plurality of sensing electrodes 300 may be formed on the substrate 100. The sensing electrodes 300 may be capable of sensing whether the input device such as the finger is touched. FIG. 1 illustrates the sensing electrode 300 extending in one direction on the substrate 100, but the embodiment is not limited thereto. Accordingly, the sensing electrodes 300 may include two types of sensing electrodes 300 having a sensing electrode extending in one direction and a sensing electrode extending in another direction crossing the one direction.

The sensing electrode 300 may include a transparent conductive material that allows electricity to flow therethrough without interrupting transmission of light. For example, the sensing electrode 200 may include metal oxide such as indium tin oxide (ITO), indium zinc oxide (IZO), copper oxide, tin oxide, zinc oxide, or titanium oxide.

Differently from the above, the sensing electrode 300 may include a nano wire, a photo sensitive nano wire film, a carbon nano tube (CNT), graphene, conductive polymer or a mixture thereof.

In addition, the sensing electrode 300 may include various metals. For example, the sensing electrode 300 may include at least one of Cr, Ni, Cu, Al, Ag, Mo, Au, Ti and the alloy thereof.

The wire electrode 500 may include a conductive material. For example, the wire electrode 500 may include a material equal or similar to that of the sensing electrode 300 described above. The sensing electrode 300 (or wire electrode) may be formed in a mesh shape. In detail, the sensing electrode 300 may include a plurality of conductive patterns and the conductive patterns may be disposed in the mesh shape while crossing each other.

In detail, the sensing electrode 300 includes a conductive pattern opening OA and a conductive pattern line LA. The sensing electrode 300 may be disposed in the mesh shape. In this case, the mesh shape may be formed in random to prevent a moiré phenomenon. The moiré phenomenon occurs when periodical stripes overlap with each other. Since adjacent strips overlap with each other, a thickness of a strip is thickened so that the strip is spotlighted as compared with other stripes. Thus, in order to prevent such a moiré phenomenon, the conductive pattern line LA may be provided in various shapes.

As shown in FIG. 1, the conductive pattern line LA may have a regular shape. The shape of the conductive pattern opening OA may be determined by the shape of the conductive pattern line LA.

The shape of the conductive pattern opening OA may be formed in various shapes. For example, the conductive pattern opening OA may have various shapes such as a polygonal shape including a rectangular shape, a diamond shape, a pentagonal shape or a hexagonal shape, or a circular shape. The conductive pattern opening OA may be formed in a regular or random shape. The sensing electrode 300 may have a mesh shape, so that the pattern of the sensing electrode 300 may not be viewed on the active area AA. That is, even though the sensing electrode 300 is formed of metal, the conductive pattern line LA may not be viewed.

In addition, even if the sensing electrode 300 is applied to a large-size touch window, the resistance of the touch window may be lowered. In addition, even when the sensing electrode 300 is formed through a printing process, the printing quality can be improved so that the high-quality touch window can be ensured.

The opening part 400 may be formed between the plurality of sensing electrodes 300. The opening part 400 may allow the adjacent sensing electrodes 300 to be electrically open circuited to each other. Any conductive pattern lines LA may not be formed in the opening part 400.

The opening part 400 may be formed in a direction parallel to the wire electrode 500. The opening part 400 may separate the sensing electrodes 300 from each other, which are electrically connected to the wire electrodes 500, respectively.

The opening part 400 is formed between the sensing electrodes 300, such that the adjacent sensing electrodes 300 are prevented from being short circuited to each other. Thus, an electric short of the wire electrode 500 may be prevented, so that a touch position may be exactly sensed.

FIGS. 4 and 5 are views illustrating a method of manufacturing a touch window according to an embodiment.

The sensing electrode 300 according to an embodiment may be formed in a mesh shape by etching an electrode layer disposed on an entire surface of the substrate 100. For example, a Cu mesh electrode having an embossed mesh shape may be formed by etching the Cu layer after metal such as Cu is deposited on the entire surface of a substrate 100 such as polyethyleneterephthalate.

In more detail, referring to FIG. 4, an electrode layer 310 is formed on the substrate 100.

The electrode layer 310 may be formed on an entire surface of the active area AA of the substrate 100 in a mesh shape. The electrode layer 310 may be coated on the substrate 100 to have a regular or irregular shape.

The electrode layer 310 may include metal having superior electric conductivity. For example, the electrode layer 310 may include at least one of Cr, Ni, Cu, Al, Ag, Mo, Au, Ti and the alloy thereof.

Referring to FIG. 5, the opening part 400 may be formed in the substrate 100 on which the electrode layer 310 is coated. A plurality of sensing electrodes 300 may be defined by the opening part 400.

The opening part 400 may be formed by penetrating the electrode layer 310. The opening part may be formed by exposing a portion of the substrate 100.

The opening part 400 may be formed by selectively etching the electrode layer 310. In addition, the opening part 400 may be formed through a laser cutting scheme.

The opening part 400 may be formed in a direction parallel to the wire electrode 500. The opening part 400 may separate the sensing electrodes 300 from each other, which are electrically connected to the wire electrodes 500, respectively, so that a touch position may be exactly sensed.

FIGS. 6 and 7 are views showing the touch window according to another embodiment, where FIG. 6 is a perspective view of the touch window when viewed in the direction of C. FIG. 7 is a sectional view taken along line D-D' of FIG. 6.

According to the touch window 10 of another embodiment, the sensing electrode 300 may be formed by forming a resin layer 110 (or intermediate layer) including photo-curable resin (UV resin) or thermosetting resin on the substrate 100, forming an intaglio part 113 having a mesh shape on the resin layer 110 and then filling the intaglio part 113 with a conductive material. In this case, the intaglio part 113 of the resin layer 110 may be formed by imprinting the mold having an embossed pattern.

In the following description of another embodiment, the same reference numerals will be assigned to the same components and the details of structures or components the same as or similar to those of the embodiment will be omitted.

In detail, referring to FIGS. 6 and 7, the touch window 10 according to another embodiment includes a resin layer 110 formed on the substrate 100.

A plurality of intaglio parts 113 may be formed in the resin layer 110. The intaglio parts 113 may be formed by recessing the top surface of the resin layer 110.

The region between the intaglio parts 113 may be defined as the opening part 400. The opening part 400 may be provided on the same plane as the top surface of the resin layer 110. In other words, the intaglio parts 113 may be formed in the resin layer 110 and the opening part 400 may be defined as the region in which any intaglio parts 113 are not formed. That is, the opening part 400 may be formed to have a thickness greater than that of the intaglio part 113.

The intaglio part 113 may be formed through an imprinting process. In addition, the intaglio part 113 may be formed through a photolithography process.

An electrode material may be introduced into the intaglio part 113 to form the sensing electrode 300. The sensing electrode 300 may be formed to have a height equal to that of the intaglio part 113. In addition, the sensing electrode 300 may be formed to have a height less than that of the intaglio part 113. The electrode material may include a metal having superior electric conductivity. For example, the electrode material may include Cr, Ni, Cu, Al, Ag, Mo, or the alloy thereof.

Since the intaglio part 113 into which the electrode material is introduced corresponds to the conductive pattern line LA and the top surface of the resin layer 100 in which the intaglio part 113 is not formed corresponds to the conductive pattern opening OA, the mesh shape of the sensing electrode 300 may be defined by the shape of the intaglio part 113.

The shapes of the sensing electrodes 300 may be defined by that of the opening part 400. The sensing electrodes 300 may be prevented from being short-circuited with each other through the opening part 400. The opening part 400 may be formed to have a thickness greater than the intaglio part 113, so that the electrode material is prevented from overflowing during the manufacturing process or electrons are effectively prevented from moving in use. Even when the electrode material moves to an outside of the intaglio part 113 during the manufacturing process or in use, charges or materials may be prevented from moving through the opening part 400, so that the sensing electrodes 300 are prevented from being short-circuited with each other.

FIG. 8 is an enlarged view showing a touch window according to still another embodiment.

FIG. 9 is a perspective view of the touch window of FIG. 8 when viewed in the direction of C. FIG. 10 is a sectional view taken along line D-D' of FIG. 9.

According to the touch window 10 of still another embodiment, the sensing electrode 300 may be formed by forming a resin layer 120 (or intermediate layer) including photocurable resin (UV resin) or thermosetting resin on the substrate 100, forming first and second sub-patterns 210 and 220 having an embossed or intaglio mesh shape on the resin layer 120 and then depositing an electrode layer on the resin layer 120 with at least one of Cr, Ni, Cu, Al, Ag, Mo and the alloy thereof through a sputtering process.

The embossed patterns of the first and second sub-patterns 210 and 220 may be formed by imprinting a mold an intaglio pattern. The intaglio patterns of the first and second sub-patterns 210 and 220 may be formed by imprinting a mold having an embossed pattern.

Then, the electrode layer formed on the first and second sub-patterns 210 and 220 may be etched such that the electrode layer on the second sub-pattern 220 is removed and the electrode layer on the first sub-pattern 210 remains, thereby forming the metal electrode having the mesh shape.

In this case, when the electrode layer is etched, an etching rate may vary depending on the bonding area of the electrode layer with respect to the first and second sub-patterns 210 and 220. That is, since the bonding area between the first sub-pattern 210 and the electrode layer is wider than the bonding area between the second sub-pattern 220 and the electrode layer, the electrode material formed on the first sub-pattern 210 may be less etched. Thus, as the etching process is performed at the same etch rate, the electrode layer formed on the first sub-pattern 210 remains and the electrode layer formed on the second sub-pattern 220 is etched to be removed, so that the metal electrode may be formed on the substrate 100 corresponding to the embossed or intaglio shape of the first sub-pattern 210.

Hereinafter, a method of manufacturing still another embodiment will be described in more detail with reference to FIGS. 8 to 10. The touch window 10 according to still another embodiment includes a resin layer 120 formed on the substrate 100.

The first and second sub-patterns 210 and 220 may be formed on the resin layer 120.

The first and second sub-patterns 210 and 220 may be formed through an imprinting process by a mold 130.

The sensing electrode 300 is formed on the first sub-pattern 210. The first sub-pattern 210 may be formed on an area corresponding to the conductive pattern line LA. The shape of the sensing electrode 300 may be defined by the shape of the first sub-pattern 210. Thus, the first sub-pattern 210 may be disposed in a mesh shape. The first sub-pattern 210 may protrude from the resin layer 120.

The electrode layer 310 may be formed by coating an electrode material on the first sub-pattern 210. As described above, the electrode material may include metal having superior electric conductivity.

The second sub-pattern 220 may be formed on the conductive pattern opening OA. Thus, the second sub-pattern 220 may be formed on an area between the first sub-patterns 210. The second sub-pattern 220 may protrude from the resin layer 120. A line width of the second sub-pattern 220 may be less than that of the first sub-pattern 210. A height of the second sub-pattern 220 may be less than that of the first sub-pattern 210.

The first and second sub-patterns 210 and 220 may be formed integrally with the resin layer 120. The first and second sub-patterns 210 and 220 may include resin or polymer.

An opening part 400 may be formed in the first sub-pattern 210. The opening part 400 may be defined as an area between the first sub-patterns 210. The opening part 400 may be provided on the same plane as the top surface of the resin layer 110. In other words, the first sub-patterns 210 may be formed on the resin layer 110 and the opening part 400 may be defined as the area between the first sub-patterns 210 in a longitudinal direction of the first sub-patterns 210. The opening part 400 may be more recessed than the first sub-pattern 210.

The shapes of the sensing electrodes 300 may be defined by the shape of the opening part 400. The sensing electrodes 300 may be prevented from being short-circuited with each other through the opening part 400. The opening part 400 may be formed to be more recessed than the first sub-pattern 210, so that the electrode material is prevented from overflowing during the manufacturing process or charge transfer can be effectively prevented in use. Even when the electrode material moves to an area between the first sub-patterns 210 during the manufacturing process or in use, charges or materials may be prevented from moving through the opening part 400, so that the sensing electrodes 300 are prevented from being short-circuited with each other.

Hereinafter, a touch window according to still another embodiment will be described in detail with reference to FIGS. 11 and 12.

Referring to FIG. 11, the touch window 10 according to still another embodiment includes a substrate 100 in which an active area AA for sensing a position of an input device (e.g., finger) and an unactive area UA provided at a peripheral portion of the active area AA are defined.

The sensing electrode 300 may be formed in the active area AA such that the input device may be sensed. The wire electrode 500 electrically connected to the sensing electrode 300 may be formed in the unactive area UA. In addition, an external circuit connected to the wire electrode 500 may be placed in the unactive area UA.

When an input device such as a finger is touched onto the touch window, the difference in capacitance is made on a touched portion by the input device, and the touched portion representing the difference in capacitance may be detected as a touch point.

Such a touch window will be described in more detail as follows.

The substrate 100 may be formed of various materials capable of supporting the sensing electrode 300, the wire electrode 500 and a circuit substrate 100 which are formed on the substrate 100. The substrate 100 may include a glass substrate 100 or a plastic substrate 100.

An outer dummy layer may be formed in the unactive area UA of the substrate 100. The outer dummy layer may be coated with a material having a predetermined color so that the wire electrode 500 and the printed circuit board 100 connecting the wire electrode 500 to the external circuit cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The sensing electrode 300 may be formed on the substrate 100. The sensing electrode 300 may be capable of sensing whether the input device such as the finger is touched. FIG. 8 illustrates the sensing electrode 300 extending in one direction on the substrate 100, but the embodiment is not limited thereto. Accordingly, the sensing electrode 300 may include two types of sensing electrodes 300 having a sensing electrode extending in one direction and a sensing electrode extending in another direction crossing the one direction.

Meanwhile, the sensing electrode 300 includes a first conductive pattern. For example, the sensing electrode 300 may be disposed in a mesh shape. In this case, the mesh shape may be formed in random to prevent a moiré phenomenon. The moiré phenomenon occurs when periodical stripes overlap with each other. Since adjacent strips overlap with each other, a thickness of a strip is thickened so that the strip is spotlighted as compared with other stripes. Thus, in order to prevent such a moiré phenomenon, the conductive pattern may be provided in various shapes.

In detail, the sensing electrode 300 includes a conductive pattern opening OA and a conductive pattern line LA. Conductive pattern lines are disposed on the conductive pattern line LA. In this case, the conductive pattern line LA may have a line width in the range of 0.1 μm to 10 μm. The conductive pattern line LA having a line width of 0.1 μm or less may not be formed due to the characteristics of the manufacturing process. If the line width is 10 μm or less, the pattern of the sensing electrode 300 may not be viewed. Preferably, the line width of the conductive pattern line LA may be in the range of 1 μm to 10 μm.

Meanwhile, as shown in FIG. 11, the conductive pattern may have a regular shape. That is, the conductive pattern opening OA may have a rectangular shape, but the embodiment is not limited thereto. The conductive pattern opening OA may have various shapes such as a polygonal shape including a diamond shape, a pentagonal shape or a hexagonal shape, or a circular shape.

In addition, the embodiment is not limited to the above. The conductive pattern may have an irregular shape. The conductive pattern opening may be variously provided in one conductive pattern. Thus, the sensing electrode 300 may include various shapes of conductive pattern openings.

The sensing electrode 300 may have a mesh shape, so that the pattern of the sensing electrode 300 may not be viewed on the active area AA. That is, even though the sensing electrode 300 is formed of metal, the pattern may not be viewed. In addition, even if the sensing electrode 300 is applied to a large-size touch window, the resistance of the touch window may be lowered. In addition, even when the sensing electrode 300 is formed through a printing process, the printing quality can be improved so that the high-quality touch window can be ensured.

Referring to FIG. 12, the sensing electrode 300 may include a first sub-pattern 210, a second sub-pattern 220 and an electrode layer 310.

The first sub-pattern 210 is disposed on the substrate 100. The first sub-pattern 210 is disposed on the mesh line LA. Thus, the first sub-pattern 210 is disposed in a mesh shape. The first sub-pattern 210 may be embossed.

The second sub-pattern 220 is provided on the substrate 100. The second sub-pattern 220 is provided in the mesh opening OA. Accordingly, the second sub-pattern 220 may be provided between the first sub-patterns 210. The second sub-pattern 220 may be embossed. The line width of the second sub-pattern 220 may be less than that of the first sub-pattern 210.

The first and second sub-patterns 210 and 220 may include resin or polymer.

The electrode layer 310 is provided on the first sub-pattern 210 in the sensing electrode 300. Accordingly, the electrode layer 310 is provided on the mesh line LA. The electrode layer 310 may be provided in a mesh shape. The electrode layer 310 may include various metals representing superior electric conductivity. For example, the electrode layer 310 may include Cu, Au, Ag, Al, Ti, Ni, or the alloy thereof.

Meanwhile, an opening part 400 is disposed between the sensing electrodes 300. The opening part 400 may include the second conductive pattern. That is, the opening part 400 may include the sensing electrode 300 and another conductive pattern. The interval D2 of the opening part 400 may be larger than the line width T1 of the conductive pattern line and may be less than the interval D1 between the conductive pattern lines. For example, the interval D2 of the opening part 400 may be in the range of 1 μm to 500 μm. Thus, the electric property of the sensing electrode 300 and the visibility of the touch window may be improved. That is, the possibility of electric conduction due to the non-etching of the electrode layer 310 included in the sensing electrode 300 may be reduced and the sensing electrode 300 may be prevented from being viewed. Therefore, the reliability of the touch window may be improved.

The opening part 400 may include dummy patterns 410 and a short-circuited pattern 420.

The dummy pattern 410 may include the first sub-pattern 210 and a dummy layer 411 disposed on the first sub-pattern 210. Meanwhile, as shown in FIG. 2, the intervals d1 between the dummy patterns 410 may be constant.

Meanwhile, the interval d1 between the dummy patterns 410 is larger than the line width T1 of the conductive pattern line and may be less than the interval D1 between the conductive pattern lines. For example, the interval d2 between the dummy patterns 410 may be in the range of 1 μm to 500 μm.

In addition, the interval between the dummy pattern 410 and the first conductive pattern may be larger than the line width T1 of the conductive pattern line and may be less than the interval D2 between the conductive pattern lines. For example, the interval between the dummy pattern 410 and the first conductive pattern may be in the range of 1 μm to 500 μm. When the interval between the dummy pattern 410 and the first conductive pattern may be less than the line width T1 of the conductive pattern line, the electrodes may be short-circuited with each other so that an error occurs. In addition, when the interval between the dummy pattern 410 and the first conductive pattern is larger than the interval D1 between the conductive pattern lines, a milky phenomenon (blur phenomenon) may occur, causing the result the same as the case having no dummy pattern.

In this case, the dummy layer 411 may include the same material as the electrode layer 310.

The short-circuited pattern 420 is disposed adjacently to the dummy pattern 410. The short-circuited pattern 420 includes the first sub-pattern 210. That is, the short-circuited pattern 420 may be a pattern that does not include a dummy layer 411 on the first sub-pattern 210.

Meanwhile, Hereinafter, a touch window according to still another embodiment will be described with reference to FIGS. 13 to 16, and the details of structures or components the same as or similar to those of the above-described embodiments will be omitted for the purpose of convenience or clarity.

Referring to FIGS. 13 and 14, the sensing electrode 300 of a touch window according to still another embodiment may include another type of a conductive pattern. That is, the sensing electrode 300 may include a conductive pattern different from the conductive pattern depicted in FIG. 8. In this case, the conductive pattern of an opening part 400 may be changed.

Referring to FIGS. 15 and 16, the sensing electrode 300 may include a first sub-pattern 210, a second sub-pattern 220 and an electrode layer 310.

The first sub-pattern 210 is disposed on the substrate 100. The first sub-pattern 210 is disposed on the mesh line LA. Thus, the first sub-pattern 210 is disposed in a mesh shape. The first sub-pattern 210 may be embossed.

The second sub-pattern 220 is provided on the substrate 100. The second sub-pattern 220 is provided in the mesh opening OA. Accordingly, the second sub-pattern 220 may be provided between the first sub-patterns 210. The second sub-pattern 220 may be embossed. The line width of the second sub-pattern 220 may be narrower than that of the first sub-pattern 210.

The first and second sub-patterns 210 and 220 may include resin or polymer.

The electrode layer 310 is provided on the first sub-pattern 210. Accordingly, the electrode layer 310 is provided on the mesh line LA. The electrode layer 310 may be provided in a mesh shape. The electrode layer 310 may include various metals representing superior electric conductivity. For example, the electrode layer 310 may include Cu, Au, Ag, Al, Ti, Ni, or the alloy thereof.

The opening part 400 may include a short-circuited pattern 420 and dummy patterns 410.

The dummy pattern 410 may include the first sub-pattern 210 and a dummy layer 411 disposed on the first sub-pattern 210. Meanwhile, as shown in FIG. 4, the intervals between the dummy patterns 410 may be constant.

In this case, the dummy layer 411 may include the same material as the electrode layer 310.

Referring to FIGS. 14 and 16, the short-circuited pattern 420 is disposed adjacently to the dummy pattern 410. The short-circuited pattern 420 includes the first sub-pattern 210. That is, the short-circuited pattern 420 may be a pattern that does not include a dummy layer 411 on the first sub-pattern 210.

Referring to FIG. 18, the number of dummy patterns 410 disposed in the opening part 400 may vary. That is, the number of dummy patterns 410 may be less than that of the dummy patterns 410 depicted in FIG. 4. However, the embodiment is not limited to the above, but more many dummy patterns 410 may be provided. In this case, the intervals d1 and d2 between the dummy patterns 410 may be constant. That is, the intervals d1 and d2 between the dummy patterns 410 may be equal to each other.

Meanwhile, referring to FIG. 18, the number of dummy patterns 410 disposed in the opening part 400 may vary. In this case, the intervals d1 and d2 between the dummy patterns 410 may be provided in two or more types. That is, the intervals d3 and d4 between the dummy patterns 410 may be variously provided. For example, the intervals d3 and d4 between the dummy patterns 410 may be different from each other.

In addition, referring to FIG. 18, the line widths d3 and d4 of the short-circuited patterns 420 disposed in the opening part 400 may be variously provided. That is, the line widths d3 and d4 of the short-circuited patterns 420 may be provided in two or more types. For example, the line widths d3 and d4 between the short-circuited patterns 420 may be different from each other.

Meanwhile, referring to FIG. 19, the line widths T2, T3 and T4 of the dummy patterns 410 disposed in the opening part 400 may be variously provided. That is, the line widths T2, T3 and T4 of the dummy patterns 410 may be provided in two or more types. As shown in FIG. 17, the line widths T2, T3 and T4 of the dummy patterns 410 may be provided in three types.

Meanwhile, referring to FIGS. 20 and 21, the dummy patterns 410 disposed in the opening part 400 may have various shapes. For example, as shown in FIG. 20, the dummy patterns 410 may have various sizes of rectangular shapes. However, the embodiment is not limited to the above, and the dummy patterns 410 may have various shapes such as a circular shape, a polygonal shape or a diamond shape.

Specifically, referring to FIG. 21, the opening part 400 may include a first sub-pattern 210 and a dummy layer 411, and the dummy layer 411 may be disposed only on a part of the first sub-pattern 210.

Next, referring to FIG. 22, the dummy patterns 410 disposed in the opening part 400 may have directionality different from that of the conductive pattern line of the sensing electrode 300. Therefore, the dummy patterns 410 may be disposed while crossing the conductive pattern of the sensing electrode 300. Thus, the short-circuited pattern 420 may have various directionality and various shapes.

Meanwhile, a touch window according to still another embodiment will be described with reference to FIGS. 23 and 24. Referring to FIGS. 23 and 24, the touch window according to the embodiment includes a dummy pattern 410 and short-circuited patterns 420.

In this case, the dummy pattern 410 may include a first sub-pattern 210 and a dummy layer 411 disposed on the first sub-pattern 210.

The short-circuited pattern 420 may include only a resin layer 201 supporting the first sub-pattern 210. That is, the short-circuited pattern 420 may not include the first sub-pattern 210.

The interval d1 between the dummy pattern 410 and the sensing electrode 300 may be larger than the line width T1 of the conductive pattern line and may be less than the interval D1 between the conductive pattern lines. For example, the interval d1 between the dummy pattern 410 and the sensing electrode 300 may be in the range of 1 μm to 500 μm.

The touch windows according to various embodiments described above may have various structures according to embodiments. A touch window according to still another embodiment will be described with reference to FIGS. 25 to 27. The details of structures or components the same as or similar to those of the above-described embodiments will be omitted for the purpose of convenience or clarity.

Referring to FIG. 25, a touch window 10 according to still another embodiment may include a substrate 100 and a sensing electrode 300. The sensing electrode 300 may include first and second sensing electrodes 301 and 302.

The first sensing electrode 301 may be disposed on the active area AA of the substrate 100 while extending in a first direction. In this case, the substrate 100 may be a cover substrate.

The first sensing electrode 301 may be disposed to make direct contact with the substrate 100. In addition, the second sensing electrode 302 may be disposed on the active area AA of the substrate 100 while extending in a second direction. In detail, the second electrode 302 may extend in the second direction different from the first direction and may be disposed to make direct contact with the substrate. The first and second sensing electrodes 301 and 302 may be disposed to make direct contact with the same surface of the surface 100 and may extend in mutually different directions on the same surface of the substrate 100.

The first and second sensing electrodes 301 and 302 may be disposed on the substrate 100 while being insulated from each other.

A bridge electrode may be disposed on one surface of the substrate 100 on which the sensing electrode 300 is disposed. For example, the bridge electrode may be disposed in a bar shape. In detail, the bridge electrodes may be spaced apart from each other by a predetermined interval on the active area AA in the bar form.

An insulating material may be provided on the bridge electrode. In detail, an insulating material may be partially provided on the bridge electrode and a part of the bridge electrode may be coated with the insulating material. For example, when the bridge electrode is formed in a bar form, the insulating material may be provide on an area except for one end and the opposite end, that is, both ends of the bridge electrode.

The first sensing electrodes 301 may extend while being connected to each other on the insulating material. For example, the first sensing electrodes 301 extending in the first direction may extend while being connected to each other on the insulating material.

In addition, the second sensing electrodes 302 may extend on the insulating material while be connected to each other. In detail, the second sensing electrodes 302 spaced apart from each other may be connected to the bridge electrode, such that the second sensing electrodes 302 are disposed to extend in the second direction.

Thus, the first and second sensing electrodes 301 and 302 may be electrically connected to the bridge electrode without be short-circuited with each other due to the insulating material.

Referring to FIG. 26, a touch window 10 according to still another embodiment may include a substrate 100 including first and second substrates 101 and 102 and a sensing electrode 300 including first and second sensing electrodes 301 and 302.

At least one of the first and second substrates 101 and 102 may be a cover substrate.

The first and second substrates 101 and 102 may be bonded to each other through an adhesive layer. For example, the substrates 100 may be bonded to each other through optical clear adhesive (OCA).

The sensing electrode 300 may be disposed on the first and second substrates 101 and 102. For example, the first sensing electrode 301 may be disposed on the substrate 100 and the second sensing electrode 302 may be disposed on the substrate 100.

In addition, the wire electrode 500 may include a first wire electrode 501 connected to the first sensing electrode 301 and a second wire electrode 502 connected to the second sensing electrode 302. The first wire electrode 501 may be disposed on an outer dummy layer on the substrate 100 and the second wire electrode 502 may be disposed on the substrate 100.

Hereinafter, a touch device, in which the touch window described above and a display panel are coupled to each other, will be described with reference to FIGS. 27 to 30.

In detail, referring to FIG. 27, a touch device may be formed by coupling the substrate 100 and the display panel 600 to each other. The substrate 100 and the display panel 600 may be adhesive to each other through an adhesive layer 700. For example, the substrate 100 and the display panel 600 may be bonded to each other through an adhesive layer 950 including optical clear adhesive (OCA).

In addition, referring to FIG. 28, when the second substrate 102 is further disposed on the first substrate 101, the touch device may be formed by coupling the substrate 100 and the display panel 600. The second substrate 102 and the display panel 600 may be adhesive to each other. The second substrate 102 and the display panel 600 may be adhesive to each other through the adhesive layer 700. For example, the first substrate 101 and the display panel 600 may be bonded to each other through the adhesive layer 700 including optical clear adhesive (OCA).

The display panel 600 may include first and second panel substrates 610 and 620.

If the display panel 600 is a liquid crystal display panel, the display panel 600 may have a structure in which the first panel substrate 610 including a thin film transistor (TFT) and a pixel electrode is combined with the second panel substrate 620 including color filter layers while a liquid crystal layer is interposed between the first and second panel substrates 610 and 620.

Further, the display panel 600 may be a liquid crystal display panel having a color filter on transistor (COT) structure formed by combining the first panel substrate 610 formed thereon with the TFT, a color filter, and a black matrix with the second panel substrate 620 while the liquid crystal layer is interposed between the first and second panel substrates 610 and 620. In other words, the TFT may be formed on the first panel substrate 610, a protective layer may be formed on the TFT, and the color filter layer may be formed on the protective layer. In addition, the pixel electrode, which makes contact with the TFT, is formed on the first panel substrate 610. In this case, to improve an aperture ratio and simplify a mask process, the black matrix may be omitted, and a common electrode may perform a function of the black matrix together with the inherent function thereof.

In addition, when the display panel 600 is a liquid crystal panel, the display device may further include a backlight unit for providing light at the back of the display panel 600.

When the display panel 600 is an organic light emitting device, the display panel 600 includes a self light-emitting device which does not require any additional light source. A thin film transistor is formed on the first panel substrate 610 of the display panel 600, and an organic light-emitting device (OLED) making contact with the thin film transistor is formed. The OLED may include an anode, a cathode and an organic light-emitting layer formed between the anode and the cathode. In addition, the display panel 600 may further include the second panel substrate 620, which performs the function of an encapsulation substrate 100 for encapsulation, on the OLED.

Referring to FIG. 29, a touch device according to an embodiment may include a touch panel formed integrally with the display panel 600. That is, a substrate 100 supporting at least one sensing electrode 300 may be omitted.

In detail, at least one sensing electrode 300 may be disposed on at least one surface of the display panel 600. That is, at least one sensing electrode 300 may be formed on at least one surface of the first or second panel substrate 610 or 620.

In this case, at least one sensing electrode 300 may be formed on a top surface of the substrate 100 disposed at an upper portion.

Referring to FIG. 29, a first sensing electrode 301 may be disposed on one surface of the substrate 100. In addition, the first wire connected to the first sensing electrode 301 may be disposed on the one surface of the substrate 100. In addition, the second sensing electrode 302 may be disposed on one surface of the display panel 600. Further, the second wire connected to the second sensing electrode 302 may be disposed on the one surface of the display panel 600.

The adhesive layer 700 may be disposed between the substrate 100 and the display panel 600 so that the substrate 100 is combined with the display panel 600.

In addition, the substrate 100 may further include a polarizing plate below the substrate 100. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescent display panel, the polarizing plate may be an anti-reflection polarizing plate.

According to a touch device of an embodiment, at least one substrate 100 for supporting the sensing electrode 300 may be omitted.

Hereinafter, a touch device according to still another embodiment will be described with reference to FIG. 30. In the following description, the parts similar or identical to those of the previously described embodiment will be omitted for the purpose of clear and brief description. The same reference numbers will be assigned to the same elements.

Referring to FIG. 30, a touch device according to an embodiment may include a touch panel integrated with the display panel 600. That is, the substrate 100 for supporting at least one sensing electrode may be omitted.

For example, a sensing electrode, which serves as a sensor disposed in an active area to sense a touch, and a wire, through which an electrical signal is applied to the sensing electrode, may be formed inside the display panel. In detail, at least one sensing electrode 300 or at least one wire may be disposed inside the display panel.

The display panel includes the first and second substrates 610 and 620. In this case, at least one of the first and second sensing electrodes 301 and 302 is disposed between the first and second panel substrates 610 and 620. That is, at least one sensing electrode 300 may be disposed on at least one surface of the first or second substrate 610 or 620.

Referring to FIG. 30, the first sensing electrode 301 may be disposed on one surface of the substrate 100. In addition, the first wire connected to the first sensing electrode 301 may be disposed. Further, the second sensing electrode 302 and the second wire may be formed between the first and second panel substrates 610 and 620. That is, the second sensing electrode 302 and the second wire may be disposed inside the display panel, and the first sensing electrode 301 and the first wire may be disposed outside the display panel.

The second sensing electrode 302 and the second wire may be disposed on the top surface of the first panel substrate 610 or the rear surface of the second panel substrate 620.

In addition, a polarizing plate may be further provided at a lower portion of the substrate 100.

When the display panel is a liquid crystal display panel and the second sensing electrode 302 is formed on the top surface of the first substrate 610, the sensing electrode 300 may be formed with a thin film transistor (TFT) or a pixel electrode. In addition, when the second sensing electrode 302 is formed on the rear surface of the second panel substrate 620, a color filter layer may be formed on the sensing electrode 300 or the sensing electrode 300 may be formed on the color filter layer. When the display panel is an organic light emitting device and the second sensing electrode 302 is formed on the top surface of the first panel substrate 610, the second sensing electrode 302 may be formed with a thin film transistor or an organic light emitting device.

The touch device according to an embodiment may allow at least one substrate 100 supporting a sensing electrode 300 to be omitted. For this reason, the touch device having a thin thickness and a light weight may be formed. In addition, the sensing electrode 300 and the wire are formed with a device formed on the display panel, so that the process may be simplified and the cost may be reduced.

Hereinafter, one example of a display to which a touch window or a touch device according to one embodiment described above is applied to will be described with reference to FIGS. 31 to 34.

Referring to FIG. 31, a mobile terminal is shown as one example of the touch device. The mobile terminal may include an active area AA and an unactive area UA. The active area AA may sense a touch signal through the touch by a finger, and a command icon pattern part and a logo may be formed in the unactive area UA.

Referring to FIG. 32, the touch window may include a flexible touch window that is capable of being bent. Accordingly, the touch display including the flexible touch window may be a flexible touch display. Thus, a user may bend or curve the flexible touch window with the hand of the user. The flexible touch window may be applied to a wearable device.

Referring to FIG. 33, the touch window may be applied to a vehicle navigation system as well as a touch device such as a mobile terminal.

In addition, referring to FIG. 34, the touch window may be applied to an inner part of a vehicle. In other words, the touch window may be applied to various parts in the vehicle. Accordingly, the touch window may be applied to a dashboard 100 as well as a PND (Personal Navigation Display), so that a CID (Center Information Display) may be realized. However, the embodiment is not limited to the above, and such a touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The touch window according to an embodiment has reliability and visibility.

What is claimed is:
1. A touch window comprising:
a substrate;
a cover substrate including an active area and an unactive area on the substrate;
a sensing electrode on the active area of the substrate; and
a wire electrode electrically connected to the sensing electrode on the unactive area of the substrate,
wherein the sensing electrode includes a plurality of first sensing electrodes extending in a first direction and a plurality of second sensing electrodes extending in a second direction crossing the first direction,
wherein a first one of the first sensing electrodes includes a first sensing electrode pattern and a second one of the first sensing electrodes includes a second sensing electrode pattern,
wherein the first sensing electrode pattern includes a plurality of first mesh lines and a plurality of first mesh openings, and the second sensing electrode pattern includes a plurality of second mesh lines and a plurality of second mesh openings,
an opening part extends in the first direction, and the opening part is provided between the first sensing electrode pattern of the first one of the first sensing electrode pattern and the second sensing electrode pattern of the second one of the first sensing electrode pattern,
wherein a width of the opening part, in the second direction, is within a range of 300 µm to 500 µm.
wherein the width of the opening part is different than a distance between two adjacent ones of the first mesh lines.

2. The touch window of claim 1, wherein the opening part exposes the substrate.

3. The touch window of claim 1, wherein some portion of the opening part is formed in the first direction parallel to the wire electrode.

4. The touch window of claim 1, wherein the plurality of first sensing electrodes include at least one of Cr, Ni, Cu, Al, Ag, Mo, Au, Ti and the alloy thereof.

5. The touch window of claim 1, wherein the sensing electrodes are disposed to make direct contact with the substrate.

6. The touch window of claim 1, wherein a mesh line is not provided within the opening part.

7. The touch window of claim 1, wherein a line width of one of the first mesh lines is within a range of 0.1 µm to 10 µm.

8. The touch window of claim 1, wherein the width of the opening part is different than a line width of one of the first mesh lines.

9. The touch window of claim 1, wherein the width of the opening part is less than the distance between the two adjacent ones of the first mesh lines.

10. The touch window of claim 1, wherein a shape of the first mesh openings has a rectangular shape, a diamond shape, a pentagonal shape or a hexagonal shape, or a circular shape.

11. The touch window of claim 1, wherein a shape of one of the first sensing electrode patterns has a stripe shape, and wherein the opening part has a stripe shape.

12. The touch window of claim 1, wherein the width of the opening part is constant along a length of the opening part from a first end to a second end.

13. The touch window of claim 1, further comprising a wire pad part that extends in the second direction, the first sensing electrode pattern to connect to the wire pad part, and the wire pad part to connect to the wire electrode.

14. The touch window of claim 1, wherein the width of the opening part is constant from a first end to a second end.

15. A touch device comprising:
a display panel; and
a touch window on the display panel;
wherein the display panel includes a first substrate,
wherein a thin film transistor is formed on the first substrate,
wherein the touch window comprising:
a substrate;
a cover substrate including an active area and an unactive area on the substrate;
a sensing electrode on the active area of the substrate; and
a wire electrode electrically connected to the sensing electrode on the unactive area of the substrate,
wherein the sensing electrode includes a plurality of first sensing electrodes extending in a first direction and a plurality of second sensing electrodes extending in a second direction crossing the first direction,
wherein a first one of the first sensing electrodes includes a first sensing electrode pattern and a second one of the first sensing electrodes includes a second sensing electrode pattern, wherein the first sensing electrode pattern includes a plurality of first mesh lines and a plurality of first mesh openings, and the second sensing electrode pattern includes a plurality of second mesh lines and a plurality of second mesh openings, an opening part extends in the first direction, and the opening part is provided between the first sensing electrode pattern of the first one of the first sensing electrode pattern and the second sensing electrode pattern of the second one of the first sensing electrode pattern, wherein a width of the opening part, in the second direction, is within a range of 300 μm to 500 μm.

wherein the width of the opening part is different than a distance between two adjacent ones of the first mesh lines.

16. The touch device of claim 15, wherein the opening part exposes the substrate.

17. The touch device of claim 15, wherein some portion of the opening part is formed in the first direction parallel to the wire electrode.

18. The touch device of claim 15, wherein the plurality of first sensing electrodes include at least one of Cr, Ni, Cu, Al, Ag, Mo, Au, Ti and the alloy thereof.

19. The touch device of claim 15, wherein the sensing electrodes are disposed to make direct contact with the substrate.

20. The touch device of claim 15, wherein a mesh line is not provided within the opening part.

21. The touch device of claim 15, wherein a line width of one of the first mesh lines is within a range of 0.1 μm to 10 μm.

22. The touch device of claim 15, wherein the width of the opening part is different than a line width of one of the first mesh lines.

23. The touch device of claim 15, wherein the width of the opening part is less than the distance between the two adjacent ones of the first mesh lines.

24. The touch device of claim 15, wherein a shape of the first mesh openings has a rectangular shape, a diamond shape, a pentagonal shape or a hexagonal shape, or a circular shape.

25. The touch device of claim 15, wherein a shape of one of the first sensing electrode patterns has a stripe shape, and wherein the opening part has a stripe shape.

26. The touch device of claim 15, wherein the width of the opening part is constant along a length of the opening part from a first end to a second end.

27. The touch device of claim 15, further comprising a wire pad part that extends in the second direction, the first sensing electrode pattern to connect to the wire pad part, and the wire pad part to connect to the wire electrode.

28. The touch device of claim 15, wherein the width of the opening part is constant from a first end to a second end.

* * * * *